United States Patent [19]

Tanaka et al.

[11] Patent Number: 5,445,842
[45] Date of Patent: Aug. 29, 1995

[54] QUERCETIN-CONTAINING COLORING

[75] Inventors: Takemi Tanaka; Hisashi Okemoto; Nobuhiro Kuwahara, all of Yokohama, Japan

[73] Assignee: Ensuiko Sugar Refining Co., Ltd., Yokohama, Japan

[21] Appl. No.: 156,805

[22] Filed: Nov. 22, 1993

[30] Foreign Application Priority Data

Feb. 25, 1993 [JP] Japan .................. 5-059421

[51] Int. Cl.$^6$ ............................................. A23L 1/275
[52] U.S. Cl. .................... 426/540; 426/250; 426/590; 426/660
[58] Field of Search ............... 426/250, 540, 658, 590, 426/660

[56] References Cited

U.S. PATENT DOCUMENTS

| | | | |
|---|---|---|---|
| 5,122,381 | 6/1992 | Nishimura et al. | 426/590 |
| 5,145,781 | 9/1992 | Suzuki et al. | 426/658 |
| 5,171,573 | 12/1992 | Suzuki et al. | 426/540 X |
| 5,230,915 | 7/1993 | Shahidi et al. | 426/240 |

FOREIGN PATENT DOCUMENTS

0279016  8/1988  European Pat. Off. .
2-268643  11/1990  Japan .

OTHER PUBLICATIONS

Hackh's Chem. Dictionary, McGraw Hill Book Co. 1969, p. 562—Quercetin.
Patent Abstracts of Japan, vol. 16, No. 406 (C978) (5449), 27 Aug. 1992 of JP-A-04 136 075 (Mitsubishi Electric Corp.), 11 May 1992.
Patent Abstracts of Japan, vol. 15, No. 31 (C798) (4559), 24 Jan. 1991, of JP-A-02 268 643 (Seiwa Kasei K.K.), 2 Nov. 1990.
Patent Abstracts of Japan, vol. 14, No. 304 (C-734) (4247), 29 Jun. 1990, of JP-A-02 099 563 (San Ei Chem. Ind., Ltd.), 11 Apr. 1990.
Database WPI, Week 7943 (1979), Derwent Publications Ltd., London, GB; AN 77949B, "Stabilization of natural pigment", of JP-A-54 117 536 (Kawashima F.) 12 Sep. 1979.

*Primary Examiner*—Jeanette Hunter
*Attorney, Agent, or Firm*—Frishauf, Holtz, Goodman, Langer & Chick

[57] ABSTRACT

A quercetin-containing colorant which has as an effective component a quercetin included by cyclodextrin. Effective use thereof as a colorant is possible by imparting thereto resistance against light, heat and chemicals to quercetin which is a flavonoid yellow substance. The colorant may be added to various food products for use of quercetin as a stable coloring matter.

9 Claims, 2 Drawing Sheets

QUERCETIN-CONTAINING COLORING

FIELD OF THE INVENTION

The present invention relates to a quercetin-containing colorant, and specifically it relates to a quercetin-containing colorant which has been stabilized by forming an inclusion complex with cyclodextrin. Quercetin is a yellow substance contained in plants such as Japanese pagoda, onion and the like, and according to the present invention it is stabilized for use as a colorant.

1. Description of the Prior Art

A method has been proposed for using quercetin in food preservation, for the improvement of solubility and as an antioxidant, by its inclusion complex with cyclodextrin (Japanese Patent Publication No. Hei 2-268643), but no method has been heretofore known for the use of quercetin/cyclodextrin inclusion complexes as pigments.

2. Summary of the Invention

Quercetin is alkali-soluble, but at pHs lower than neutral it becomes poorly soluble and its color changes considerably.

Quercetin is an aglycon of rutin and quercitrin, and it is widely distributed among plants, imparting a bright yellow color thereto under alkaline conditions. However, quercetin is unstable under light and heat, and therefore it is almost never used as a colorant.

An object of the present invention is to impart to quercetin resistance against light, heat and chemicals, thus providing a method for its use as a colorant.

DETAILED DESCRIPTION OF THE INVENTION

The present invention relates to a quercetin-containing colorant having as an effective component a quercetin included by cyclodextrin.

The quercetin to be used may be, in addition to crude and purified products obtained by extraction from the above mentioned plants, commercially available products (for example, products of Tokyo Kasei, Inc.).

Also, cyclodextrin (hereunder abbreviated to "CD") is a cyclic oligosaccharide with a polymerization degree of 6-8 which is obtained by allowing cyclodextrin glucanotransferase (CGTase, EC 2.4.1.19) to act on starch or a hydrolysate thereof, and specific examples thereof include α-, β- and γ-CD. According to the present invention, β-CD is particularly suitable.

quercetin-containing colorant according to the present invention may be obtained in the following manner.

First, 1-2 parts by weight of quercetin which has been dissolved in an organic solvent such as ethanol, is added to 10 parts by weight of CD which is dissolved to saturation in water, etc. as the solvent, and the mixture is vigorously stirred. Depending on the degree of stirring, it is carried out for 10 minutes to 3 hours, and normally 60 minutes or more, and cooling is effected while stirring with care so that the temperature does not rise too much over 80.

After completion of the stirring, since most of the pigment precipitates with the quercetin, the mixture is subjected to centrifugal separation (7,900×G, 10 minutes, room temperature) to separate the non-included pigment. The quercetin included by CD (hereunder sometimes shortened to quercetin/CD inclusion complex), is used as the colorant according to the present invention.

EXAMPLES

A detailed description of the present invention will now be provided with reference to the Examples.

Test Example 1

One part by weight of quercetin dissolved in 99% ethanol was added to 2 parts by weight of CD which was dissolved in water to saturation, and the mixture was vigorously stirred for 60 minutes and then subjected to centrifugal separation to obtain a quercetin/CD inclusion complex.

This quercetin/β-CD inclusion complex and unprocessed quercetin were each dissolved in a McIlvaine buffer solution (pH 7) containing 20% ethanol which had been diluted to 1/10 so that the absorbance at 400 nm was 0.4–0.8, to prepare test solutions.

Figure 1:
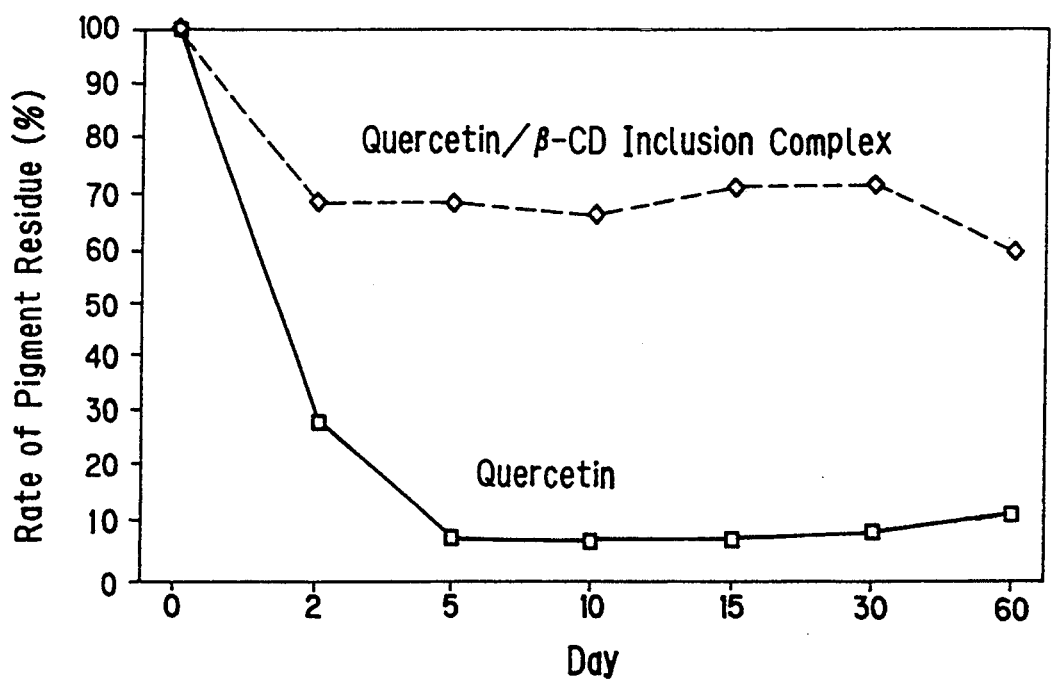
FIG. 1 is a graph showing the results of a light fastness test against fluorescent light.

A pre-determined amount of each of the test solutions was poured into a glass test tube and allowed to stand at room temperature under a fluorescent lamp at 900 lux, and the absorbance and the color difference were measured with time. The results are shown in FIG. 1. As is clear from the figure, quercetin faded under fluorescent light, but the fading was considerably suppressed with quercetin/CD inclusion complex, and no change in the color tone was observed.

Test Example 2

Figure 2:
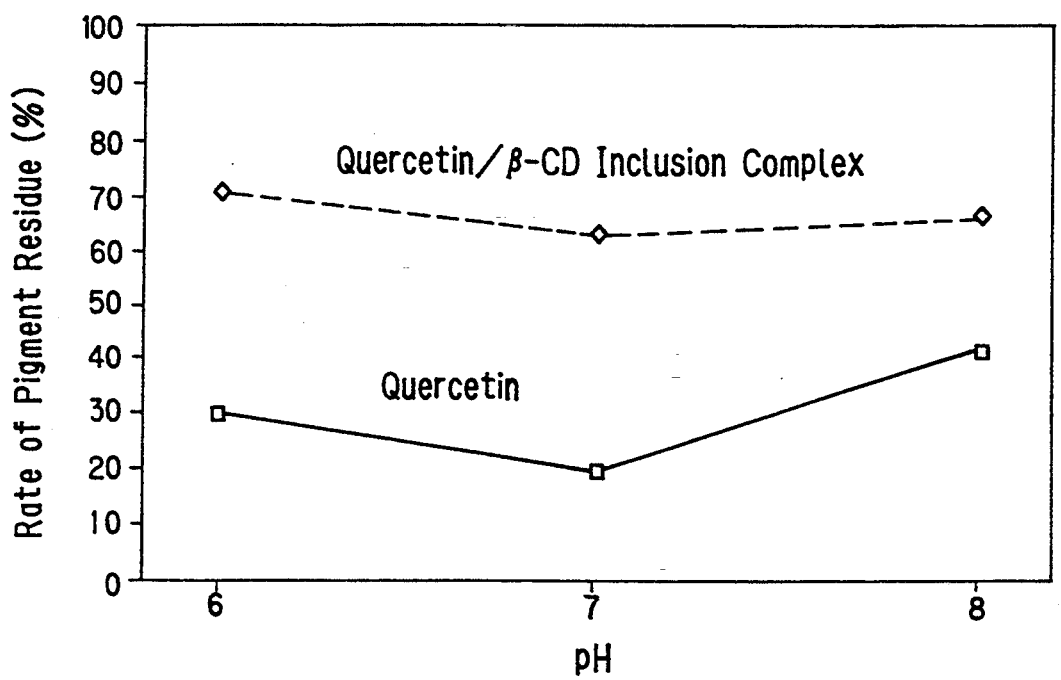
FIG. 2 is a graph showing the results of a light fastness test against ultraviolet light.

After the pH of each of the test solutions in Test Example 1 was adjusted, they were poured into transparent polyethylene bags (trade name: Stomacker 80, product of Organo, Inc.) and sealed and allowed to stand for 2 days under 256 nm ultraviolet light (30 cm from the light source), after which the absorbance was measured. The results are shown in FIG. 2. As is clear from the figure, quercetin faded under ultraviolet light, but the fading was considerably suppressed with quercetin/β-CD inclusion complex.

Test Example 3

Figure 3:
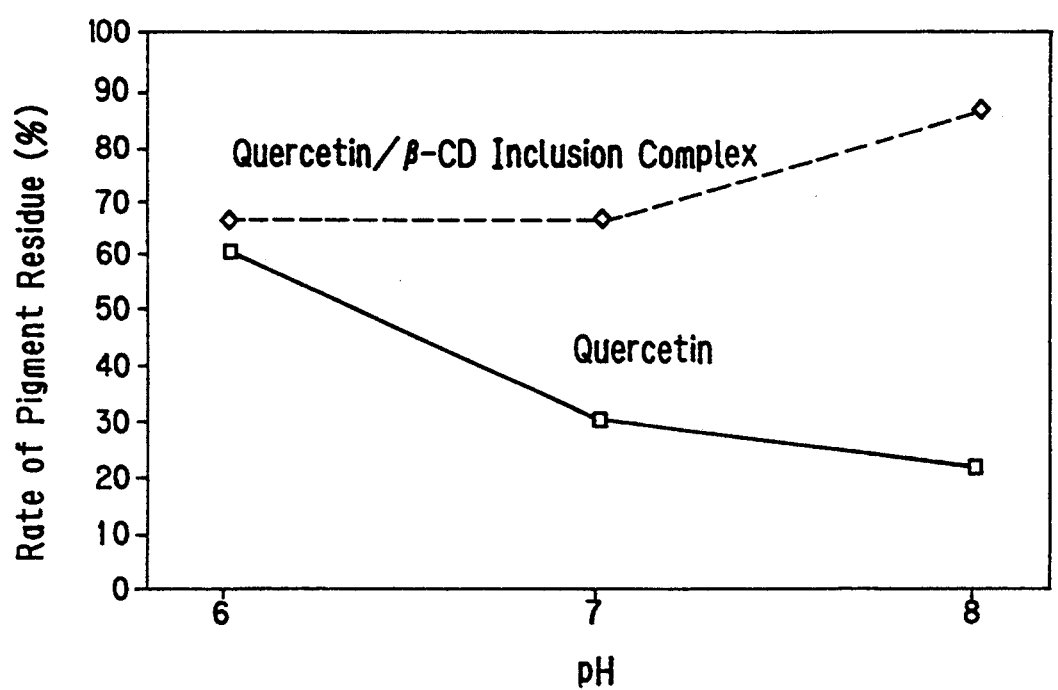
FIG. 3 is a graph showing the results of a light fastness test against ultraviolet light after thermal treatment.

After the pH of each of the test solutions in Test Example 1 was adjusted, they were subjected to thermal treatment at 121° C. for 30 minutes, after which the absorbance and color difference were measured in the same manner as in Test Example 2. The results are shown in FIG. 3. As is clear from the figure, quercetin faded, but the fading was considerably suppressed with quercetin/β-CD inclusion complex.

Test Example 4

A predetermined amount of the chemicals listed in Table 1 were added to the solutions in Test Example 1, and the performance was compared with that of a non-added solution. The same procedure was carried out with quercetin/α-CD inclusion complex and quercetin/γ-CD inclusion complex. Each of the chemicals was added to a final concentration of 100 ppm. However, ferric chloride was added to a final concentration of 5 ppm. The solutions which had a 90% or higher rate of residue of the colorant residue compared to the non-added solution were marked with a (+), and those below that were marked with a (−).

The results are shown in Table 1. As is clear from the table, quercetin alone, quercetin/α-CD inclusion complex and quercetin/γ-CD inclusion complex rapidly faded with sodium bisulfite, while with the quercetin/β-CD inclusion complex, the fading was significantly suppressed.

TABLE 1

|  | Quercetin | β-CD inclusion complex |
|---|---|---|
| Non-added | + | + |
| Sodium bisulfite | − | + |
| Sodium perchlorate | + | + |
| Aluminum chloride | + | + |
| Zinc chloride | + | + |
| Copper chloride | + | + |
| Ferric chloride | − | + |

Example 1 (Refreshment Beverage)

To 100 g of sugar were added 0.2 g of citric acid, 0.05 g of malic acid and 10 cc of lemon juice, and 200 cc of mixture prepared by addition of a 1% sodium bicarbonate solution thereto was adjusted to pH 7.0 to make a juice base.

Four volumes of water was added per one volume of the juice base in which had been dissolved quercetin, or quercetin/β-CD inclusion complex, and the mixtures were prepared so that the absorbance at 420 nm was 0.5, and then filled into glass containers which were sealed and allowed to stand for 3 weeks in a sunny place, upon which the degree of fading thereof was compared. As a result, the beverage which was colored using the quercetin/β-CD inclusion complex was more stable under light than was the one using quercetin alone.

Example 2 (Hard Candy)

A complete solution of 130 g of sugar, 100 g of malt syrup, 30 cc of water and 0.4 g of citric acid was heated to 50° C. in vacuo until it reached a sugar concentration of 97% or greater. This concentrate was heated in a boiling water bath, and when it became soft quercetin or quercetin/β-CD inclusion complex was added thereto, and the mixture was adequately mixed and poured into a mold for forming. As a result, in the case of the candy which was colored with the quercetin/β-CD inclusion complex, there was no visible difference between the solution kept while shielding the light and the one kept in a sunny place, and neither underwent fading. On the other hand, in the case of the candy colored with quercetin alone, the fading of the one which was allowed to stand in a sunny place was observed to be visibly noticeable. Thus it was determined that quercetin was stabilized by forming an inclusion complex with CD.

As mentioned above, according to the present invention it is possible to effectively use quercetin, which is a flavonoid yellow substance, as a colorant by imparting thereto resistance against light, heat and chemicals. Therefore, quercetin may be added to various food products for use as a stable coloring matter.

What is claimed is:

1. A method of coloring a food product by adding to the food product an effective food coloring amount of a colorant comprising quercetin included in a cyclodextrin.

2. The method according to claim 1, wherein in the cyclodextrin is β-cyclodextrin.

3. The method according to claim 1, wherein the colorant comprises 1 part by weight of the quercetin and 2 parts by weight of the cyclodextrin.

4. The method according to claim 1, wherein the food product is a beverage.

5. The method according to claim 1, wherein the food product is a candy.

6. A colored food composition comprising a food product and an effective food coloring amount of a colorant comprising quercetin included in β-cyclodextrin.

7. The composition according to claim 6, wherein the colorant comprises 1 part by weight of the quercetin and 2 parts by weight of the cyclodextrin.

8. The composition according to claim 6, wherein the food product is a beverage.

9. The composition according to claim 6, wherein the food product is a candy.

* * * * *